Feb. 20, 1923.

A. R. O'BRIEN.
ADJUSTABLE COUPLING.
FILED DEC. 31, 1921.

1,446,351.

A. R. O'Brien, INVENTOR.

Geo. P. Kimmel, ATTORNEY.

Patented Feb. 20, 1923.

1,446,351

UNITED STATES PATENT OFFICE.

ALEXANDER R. O'BRIEN, OF WICHITA, KANSAS, ASSIGNOR OF ONE-THIRD TO W. G. PARRY, OF AUGUSTA, KANSAS.

ADJUSTABLE COUPLING.

Application filed December 31, 1921. Serial No. 526,213.

*To all whom it may concern:*

Be it known that I, ALEXANDER R. O'BRIEN, a citizen of the United States, residing at Wichita, in the county of Sedgwick and State of Kansas, have invented certain new and useful Improvements in Adjustable Couplings, of which the following is a specification.

This invention appertains to certain improvements in adjustable couplings generally, and more particularly to a type of the same adapted for the coupling together of reciprocating parts or elements of any and all classes of mechanisms, such as the operating pitman, or piston rods of pumps and the like.

The principal object of this invention is to provide for a coupling as specified, and one of an extremely simplified and comparatively inexpensive construction and arrangement capable of lateral adjustment, whereby to effect the coupling together of adjacent ends of reciprocating parts or elements of pitman, piston rods, or the like, whether or not these parts or elements are in accurate alignment one with the other.

With the foregoing and other objects in view, the invention resides in the certain new and useful construction and arrangement of parts as will be hereinafter more fully described, set forth in the appended claims, and illustrated in the accompanying drawing, in which :—

Figure 1:
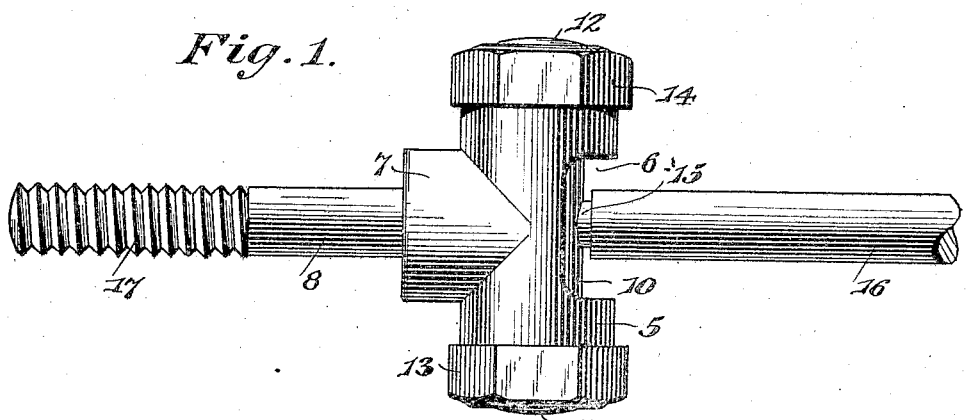
Figure 1 is a side elevation of a preferred embodiment of the coupling.

Referring to the drawing, the coupling comprises a cylindrical body portion 5 having a cylindrical bore extending concentrically and longitudinally therethrough, and a cut away portion 6 opening medially through one side thereof and elongated in the longitudinal direction of the same. The body 5 is also formed to provide an enlargement or off-set portion 7 at a point medially of its opposite ends and diametrically opposite the cut away portion or slotted opening 6, and extending centrally outward of the end face of this enlargement or off-set portion 7 is a section of rod 8, which is preferably formed to provide a squared head portion 9 at the connected end thereof embedded in the metal of the enlargement 7 cast around the same, or the rod or element 8 may be otherwise secured in the enlargement 7 as to be either fixedly or removably engaged therewith.

Figure 2:
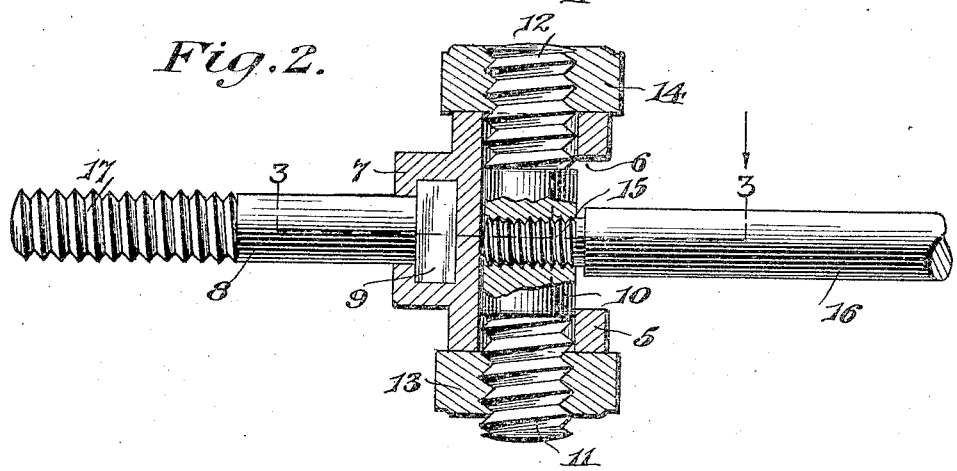
Figure 2 is a vertical section thereof.
Figure 3:
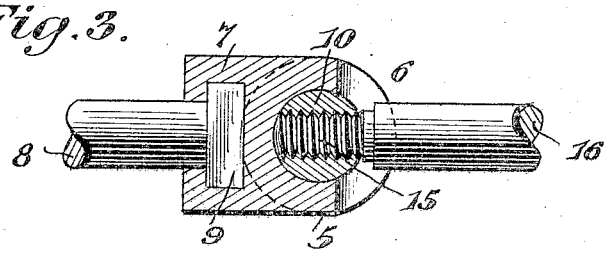
Figure 3 is a transverse section taken on the line 3—3 of Figure 2.

Mounted within the longitudinal bore of the coupling body 5 is a cylindrical coupling pin 10, which has its opposite ends threaded as at 11 and 12, and the intermediate portion thereof smooth surfaced substantially as shown in Figure 2. One of the ends of the pin 10 preferably has its threads arranged for the screwing thereon of a nut 13 in a right-handed direction, and the other end thereof, for the screwing thereon of a nut 14 in a left-handed direction, whereby upon the equal screwing up of the nuts 13 and 14 into abutting relation with the ends of the body 5 complemental thereto, the intermediate smooth surfaced portion of the pin will be centered with respect to the slotted opening or cut away portion 6 of the coupling.

Extending diametrically through the intermediate portion of the pin 10 is a threaded opening into which is to be threaded the complementally threaded end of a pitman or piston rod 15, after the pin 10 has been properly positioned within the bore of the coupling body 5. The rod 15 is inserted inwardly of the slotted opening or cut away portion 6 which is provided for the purpose.

In a specific instance of the use of a coupling constructed and arranged in accordance with the present invention, and in effecting the coupling of a feed water pump to the cross head of a steam tractor engine or the like substantially as is shown in my co-pending application filed December 31, 1921, and serially numbered 526,212, the rod section 8 will be screw threaded, as at 17, for connection with a depending arm or bar carried by the cross head of the engine, while the rod section 16 will constitute the piston rod of the pump. If, after mounting the pump on the engine, it is found that the piston rod 16 is out of alignment with the rod section 8, which has previously been secured in position on the cross head, by unthreading one of the nuts 13 or 14 on either of the opposite ends of the coupling pin 10, and tightening up on the other thereof, the pin will be adjusted longitudinally of the bore of the coupling body 5 and will be brought into proper position for the insertion of the threaded end 16 through opening 6 and into the threaded opening in the pin 10.

From the foregoing, it will be readily obvious that the coupling provided for therein is adapted for universal use in securing together the adjacent ends of any and all classes of sectional mechanical elements such as bars, rods, pitmans or the like, whether such elements are aligned one with the other or not, and in the particular adaptation of the coupling as specified herein, is capable of effectively coupling the piston rods of feed water pumps to a moving part of the engine, irrespective of the aligning or non-aligning relation of the piston rod with the desired or necessary point of connection of the same with the said moving part of the engine.

It is well understood that, while a preferred embodiment of the coupling has been described and illustrated herein in specific terms and details of construction and arrangement, various changes in and modifications of the same may be resorted to without departing from the spirit of the invention or the scope of the claims appended hereto.

Having thus particularly described the invention, what is claimed is:—

1. In a device as characterized, a coupling body adapted to be secured on one end of a part and having a bore extending through the same at right angles to the said part, a coupling pin disposed within the bore of said body and adapted to have secured thereto the adjacent end of a second part, and means for adjusting said coupling pin within the bore of said coupling body whereby to couple the said parts together irrespective of the aligning or non-aligning relation of one part with respect to the other thereof.

2. In a device as characterized, an elongated coupling body adapted to be secured on one end of a part with its longitudinal axis in right angular relation with respect to that of the said part and having a bore extending longitudinally thereof, a coupling pin disposed within the bore of said body and adapted to have secured thereto the adjacent end of a second part, and means for adjusting said coupling pin within the bore of said body whereby to couple the said parts together irrespective of the aligning or non-aligning relation of one part with respect to the other thereof.

3. In a device as characterized, a cylindrical coupling body adapted to be secured on one end of a part with its longitudinal axis in right angular relation with respect to that of the said part, said coupling body having a bore extending longitudinally thereof and a slotted opening formed medially of the opposite ends thereof and opening into the bore, a coupling pin disposed within the bore of said body and adapted to have secured thereto the adjacent end of a second part projecting inwardly of the said slotted opening, and means for adjusting said coupling pin within the bore of said body whereby to couple said parts together irrespective of the aligning or non-aligning relation of one part with respect to the other thereof.

4. In a device as characterized, a cylindrical coupling body adapted to be secured on one end of a part with its longitudinal axis in right angular relation with respect to that of the said parts, said coupling body having a bore extending longitudinally thereof and a slotted opening formed longitudinally of and medially of the opposite ends thereof and opening into the bore, a coupling pin disposed within the bore of said body and adapted to have secured thereto the adjacent end of a second part projecting inwardly of the said slotted opening, and nuts threaded on the opposite ends of said coupling pin for adjusting the same within the bore of said body whereby to couple said parts together irrespective of the aligning or non-aligning relation of one part with respect to the other thereof.

5. In a device as characterized, a cylindrical coupling body having a bore extending coaxially thereof and a slotted opening formed medially of the opposite ends of the same and connecting the bore, an enlargement formed medially of the opposite ends of the body and at a point thereon diametrically opposite to the said slotted opening therein, a rod extending outwardly of the end of said enlargement and at right angles to the longitudinal axis of said body, a coupling pin disposed within the bore of said body and having its oppositely projecting ends threaded, one in a right hand direction and the other in a left hand direction, said coupling pin having a threaded opening extending diametrically therethrough and disposed in line with the slotted opening of said body for the connection thereto of a reciprocating part, and nuts engaged on the threaded ends of said coupling pin for effecting the adjustment thereof whereby to effect the coupling of said rod and reciprocating parts together irrespective of the same being disposed in aligning or non-aligning relation one with respect to the other.

In testimony whereof, I affix my signature hereto.

ALEXANDER R. O'BRIEN.